(12) United States Patent
Cannon

(10) Patent No.: US 7,400,150 B2
(45) Date of Patent: *Jul. 15, 2008

(54) REMOTE FAULT MONITORING IN POWER LINES

(75) Inventor: Michael Cannon, Golden Valley, MN (US)

(73) Assignee: Cannon Technologies, Inc., Golden Valley, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/334,953

(22) Filed: Jan. 19, 2006

(65) Prior Publication Data

US 2006/0176631 A1    Aug. 10, 2006

Related U.S. Application Data

(63) Continuation-in-part of application No. 11/198,813, filed on Aug. 5, 2005, now Pat. No. 7,355,412.

(60) Provisional application No. 60/598,928, filed on Aug. 5, 2004, provisional application No. 60/645,542, filed on Jan. 19, 2005.

(51) Int. Cl.
*G01R 31/08* (2006.01)

(52) U.S. Cl. .................. 324/522; 324/512; 324/535

(58) Field of Classification Search .............. 324/535
See application file for complete search history.

(56) References Cited

U.S. PATENT DOCUMENTS

| | | | |
|---|---|---|---|
| 3,983,377 A | | 9/1976 | Vitins |
| 5,202,812 A | | 4/1993 | Shinoda et al. |
| 5,428,549 A | | 6/1995 | Chen |
| 5,452,223 A | * | 9/1995 | Zuercher et al. .............. 702/58 |
| 5,506,789 A | | 4/1996 | Russell et al. |
| 5,734,575 A | | 3/1998 | Snow et al. |
| 5,751,149 A | * | 5/1998 | Oberg et al. ................ 324/533 |
| 6,300,766 B1 | * | 10/2001 | Schmalz ..................... 324/536 |
| 6,347,101 B1 | | 2/2002 | Wu et al. |
| 6,359,681 B1 | * | 3/2002 | Housand et al. ............ 356/4.01 |
| 6,404,346 B1 | * | 6/2002 | Jadric et al. ................. 340/635 |
| 6,415,244 B1 | | 7/2002 | Dickens et al. |
| 6,466,030 B2 | | 10/2002 | Hu et al. |
| 6,466,031 B1 | | 10/2002 | Hu et al. |

(Continued)

OTHER PUBLICATIONS

Cannon Technologies Yukon® Master System Software; www.cannontech.com/products/softwareapplications.asp#yukon ; 3 pages; 2006.

*Primary Examiner*—Vincent Q. Nguyen
*Assistant Examiner*—Jeff Natalini
(74) *Attorney, Agent, or Firm*—Patterson, Thuente, Skaar & Christensen, P.A.

(57) ABSTRACT

Systems and methods for remotely monitoring and detecting faults in power distribution systems. In one embodiment, a remote fault monitoring system comprises a plurality of remote fault detection devices distributed on a power distribution network, and a monitoring station. Each remote detect device includes a first electrical parameter measurement circuit electrically or electromagnetically coupled to a neutral power distribution circuit conductor, and a second electrical parameter measurement circuit electrically or electromagnetically coupled to a power distribution circuit ground conductor. The monitoring station receives measurements transmitted by the remote fault detection devices and determines from the measurements whether a fault intermediate a pair of adjacent remote fault detection devices has occurred.

22 Claims, 10 Drawing Sheets

U.S. PATENT DOCUMENTS

| | | | |
|---|---|---|---|
| 6,477,475 | B1 | 11/2002 | Takaoka et al. |
| 6,525,543 | B1 | 2/2003 | Roberts et al. |
| 6,708,126 | B2 * | 3/2004 | Culler et al. .................. 702/64 |
| 6,714,395 | B2 | 3/2004 | Meisinger, Sr. et al. |
| 6,756,786 | B2 | 6/2004 | Choi et al. |
| 6,822,457 | B2 | 11/2004 | Borchert et al. |
| 6,879,917 | B2 | 4/2005 | Turner |
| 6,900,643 | B2 * | 5/2005 | Deng et al. .................. 324/522 |
| 6,917,888 | B2 | 7/2005 | Logvinov et al. |
| 6,924,647 | B2 | 8/2005 | Saha et al. |
| 2003/0169052 | A1 * | 9/2003 | Yamada et al. .............. 324/543 |
| 2005/0021300 | A1 | 1/2005 | Kim et al. |
| 2006/0038700 | A1 | 2/2006 | Cumeralto et al. |

* cited by examiner

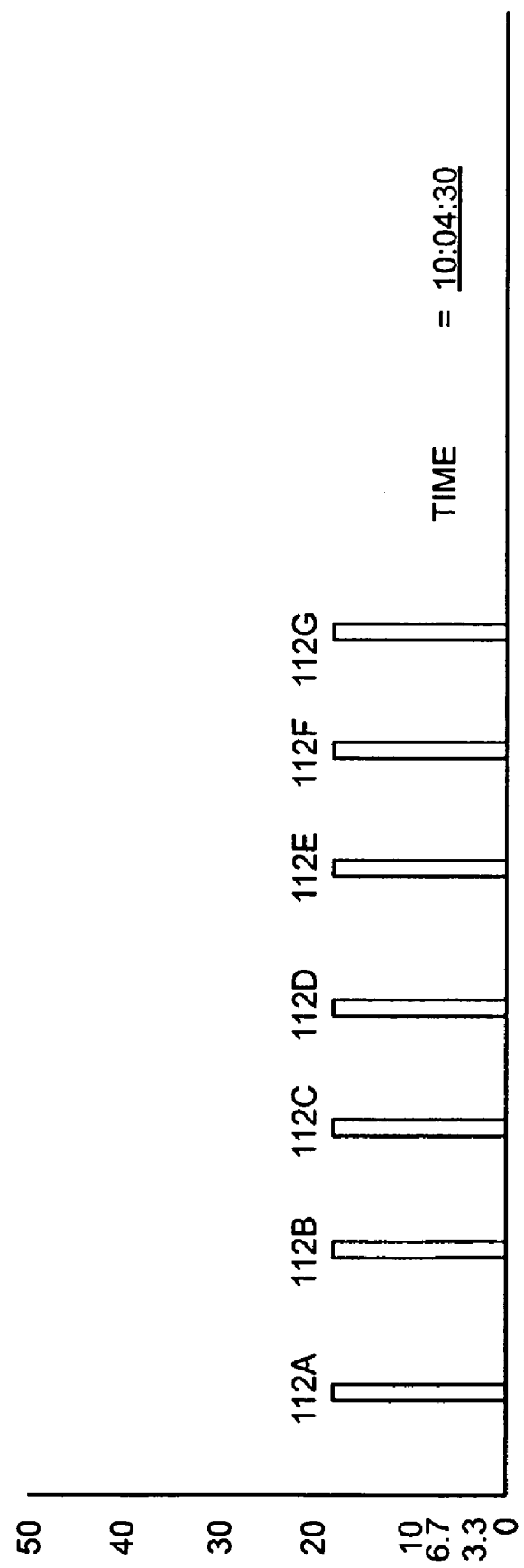

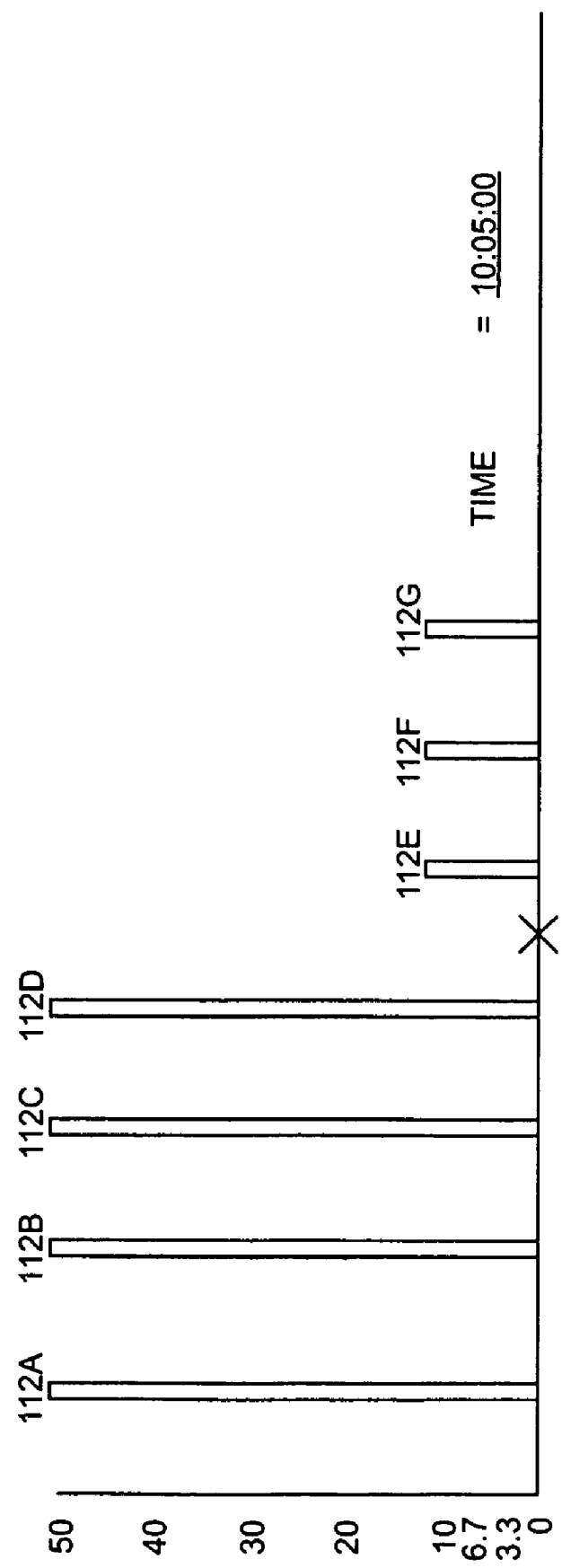

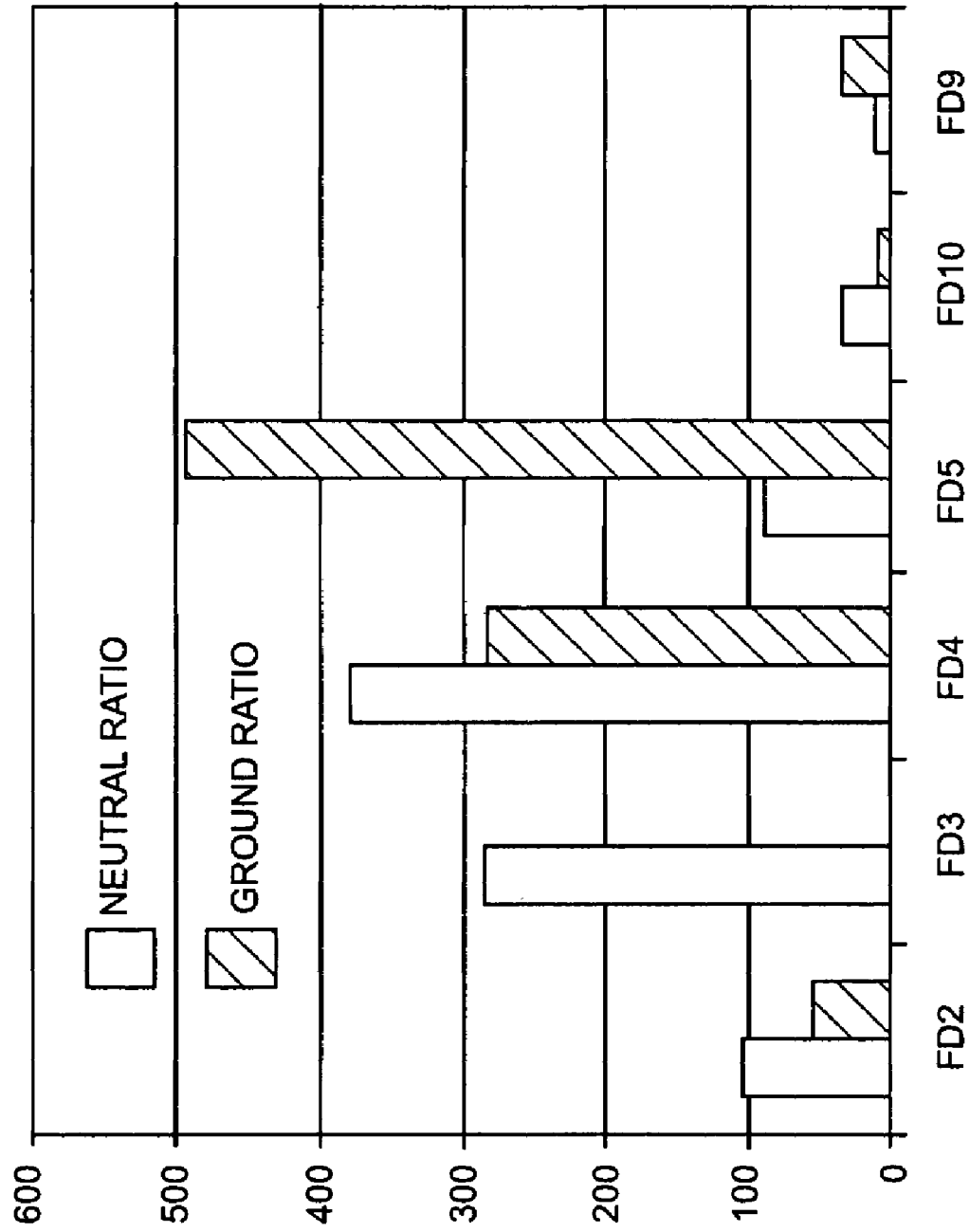

REMOTE FAULT MONITORING IN POWER LINES

RELATED APPLICATIONS

The present application is a continuation-in-part of U.S. patent application Ser. No. 11/198,813, filed Aug. 5, 2005 now U.S. Pat. No. 7,355,412, and entitled "REMOTE FAULT MONITORING SYSTEM," which claims priority to U.S. Provisional Patent Application Ser. No. 60/598,928, filed Aug. 5, 2004, and entitled "REMOTE FAULT MONITORING SYSTEM," both of which are hereby incorporated by reference. The present application claims priority to U.S. Provisional Application Ser. No. 60/645,542, filed Jan. 19, 2005, and entitled "REMOTE FAULT MONITORING SYSTEM," which is hereby incorporated by reference.

TECHNICAL FIELD

The present invention relates generally to power distribution in utility power grids, and more particularly, to detecting and localizing faults on an electric utility power distribution circuit.

BACKGROUND OF THE INVENTION

Power distribution circuits typically used by electric utilities can experience various faults that disrupt service to consumers of electricity. Causes of such faults include electrical insulation breakdown or mechanical failures. Most commonly, faults are manifested as short circuits from line to ground, but line to line short circuits and open circuit faults can also occur. When these events occur, safety devices, such as circuit breakers, can be automatically actuated to shut down the distribution circuit. It is important for the utility and its customers to have the problem located and repaired as quickly as possible so that electrical service can be restored with minimal down time. In practice, because power transmission or distribution circuits extend over large distances, repair crews must patrol the entire line section. Locating faults is thus presently time consuming and expensive due to the lost revenue and the cost of lengthy troubleshooting.

Systems known in the art for localizing power line faults include stand-alone (independently-functioning) fault detection devices deployed on distribution feeders that emit light or audible alarm signal when they detect an abnormally high current magnitude. This approach, however, does not eliminate the need for repair crews to examine long stretches of power line as part of troubleshooting a line fault. There are also other devices known in the art that can be equipped with contact outputs for use with a supervisory control and supervision (SCADA) system, but no integrated system approach exists to date for localizing faults potentially occurring over a long stretch of power line.

Other systems known in the art rely on a variety of techniques for identifying and localizing power line faults. These techniques include methods of wave modeling, impedance evaluation, signal injection, and multi-phase analysis techniques. For example, U.S. Pat. No. 6,879,917 discloses a double-ended distance-to-fault location system using time-synchronized positive- or negative-sequence voltage and current measurements from both ends of an overhead transmission line to determine the exact distance to a fault with respect to either end. U.S. Pat. No. 6,924,647 discloses a fault location method and device, wherein the method includes the step of measuring the apparent impedances of impedance relays at line terminals at each end. U.S. Pat. No. 6,525,543 discloses a fault type selection system for identifying faults in an electric power system. The fault identification system includes a first logic circuit which is responsive to conventional protective elements which recognize the presence of low resistance single line-to-ground faults for the A, B, and C phases on a power transmission line. Other systems and methods are disclosed in U.S. Pat. Nos. 5,428,549; 6,415,244; 6,477,475; 6,756,786; 6,822,457; and 6,917,888. All of the aforementioned patents are incorporated herein by reference.

Another problem experienced by utilities involves a reverse electromotive force (EMF) generated by certain loads in a power outage. Motorized equipment and appliances (air conditioners, for example) that are loads on a broken distribution circuit can, following a fault, generate an EMF in the broken circuit section that appears as a flow of power from the load in a direction opposite the ordinary flow of power during normal system operation. For example, in the case of a line fault affecting one of three phases of a power distribution circuit, a three-phase motor powered by the remaining two phases will continue running, and may well operate as a power generator producing a reverse EMF back onto the wire of the faulty phase. Measuring line current magnitude, alone, near the fault point, is therefore sometimes insufficient to distinguish between an actual fault and a momentary imbalance of the distribution circuit.

Other drawbacks associated with conventional current measuring devices include the hazards associated with installing these kinds of devices on high voltage power lines. Therefore, a need remains in the industry for an efficient and effective fault monitoring system.

SUMMARY OF THE INVENTION

The present invention substantially addresses the aforementioned needs by providing systems and methods for remotely monitoring and detecting faults in power distribution systems. Various embodiments of the present invention measure power flows in neutral and ground conductors at a plurality of locations on a power distribution feeder to localize a fault, and preferably evaluate measurements taken simultaneously at the plurality of locations to obtain a real-time multiple location view.

In one embodiment, a remote fault monitoring system comprises a plurality of remote fault detection devices distributed on a power distribution network, and a monitoring station. Each remote detection device includes a first electrical parameter measurement circuit electrically or electromagnetically coupled to a neutral power distribution circuit conductor, a second electrical parameter measurement circuit electrically or electromagnetically coupled to a power distribution circuit ground conductor, a central processing unit (CPU) electrically coupled to the first and second electrical parameter measurement circuits and adapted to obtain measurements respectively generated by the first and second electrical parameter measurement circuits, and a transceiver adapted to transmit the measurements obtained by the CPU. The monitoring station is adapted to receive measurements transmitted by the communication device and to determine from the measurements whether a fault intermediate a pair of adjacent remote fault detection devices has occurred.

In another embodiment, a method for remote fault monitoring comprises obtaining a plurality of sets of electrical measurements, each set associated with a different point in a power distribution system and comprising a neutral conductor measurement and a ground conductor measurement. A peak value, an average value, and a ratio of peak to average values for each a neutral conductor and a ground conductor are determined from the neutral conductor measurement and the ground conductor measurement. The ratios of peak to average values for the neutral conductor are compared to a predetermined limit, and if a ratio exceeds the predetermined limit, a set of ratios of peak to average values for the neutral conductor are compared to locate a decrease in the ratio at adjacent points. A fault may then be located between the adjacent points at which the decrease occurs. The method can further comprise comparing the ratios of peak to average values for the ground conductor at the adjacent points; and estimating the fault as located more closely to the point having a greater ratio of peak to average values for the ground conductor.

The above summary of the invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood from the following detailed description of various embodiments in connection with the accompanying drawings, in which:

FIG. 4A is a current measurement graph of a first time according to one embodiment of the present invention.

FIG. 4B is a current measurement graph of a second time according to one embodiment of the present invention.

FIG. 8 is a graph of conductor current ratios according to one embodiment of the present invention.

Figure 1:
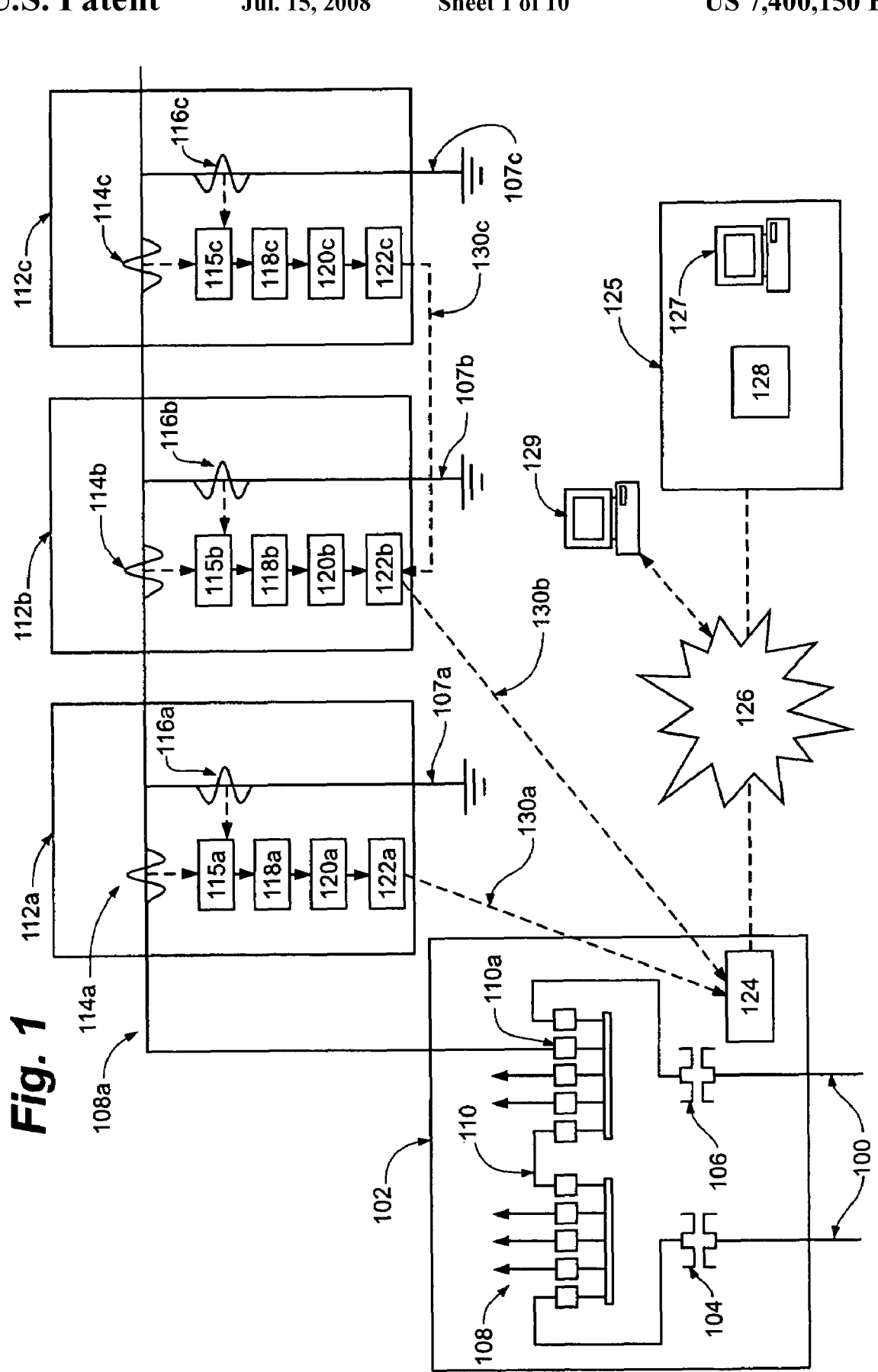
FIG. 1 is a block diagram of a remote fault monitoring system according to one embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

In this detailed description of the various embodiments, reference is made to the accompanying drawings, FIGS. 1-9B, which form a part hereof, and in which are shown by way of illustration specific embodiments in which the invention may be practiced. It is to be understood that other embodiments may be utilized and structural or logical changes may be made without departing from the scope of the invention. The following detailed description, therefore, is not to be taken in a limiting sense, and the scope of the invention is to be defined by the claims.

One aspect of the present invention utilizes communication technologies along with application software and fault detection devices, to enable rapid recognition and notification of faulted line segments to facilitate efficient manual or automatic isolation and repair thereof. In one example embodiment, a fault detection device according to the present invention comprises electrical parameter measurement circuitry, a central processing unit (CPU), and a communication device. In one embodiment of a remote fault monitoring system, a plurality of fault detection devices are installed throughout a power distribution grid. Each fault detection device is electrically or electromagnetically coupled to power distribution circuit neutral and ground conductors to monitor the current flowing in each conductor. Current magnitude information from the location of each of the plurality of fault detection devices can then be simultaneously evaluated to locate a fault.

Each fault detection device processes the monitored electrical current information to convert the information into a form suitable for data transmission. In one embodiment, the processing of the current information includes calculating a ratio or other value from the measured information.

The information is then transmitted to a substation gateway advisor or central control system via a suitable mode of communication such as a wide area network (WAN) implemented via land-based telecommunications, two-way radio, cellular, satellite-based telecommunications, or the like. The central control system collects and analyzes the electrical current information from the plurality of fault detection devices and, having a database associating each fault detection device with its corresponding location along the power distribution network, is programmed to identify one or more particular power line segments that appear to have a fault.

In a preferred embodiment, the existence of a fault is determined by evaluating current magnitudes in the neutral and ground conductors at a plurality of locations, although in other embodiments the central control system can determine an existence of a fault condition in various other ways, such as by recognizing a change of current direction from one of the fault detection devices, or by recognizing a condition where neighboring fault detection devices report other disparate electrical measurements. Information regarding a detected and localized fault may then be presented graphically or made available via a report or other format suitable for enabling dispatch of repair personnel to the fault locations(s). In addition, the determined fault location information may be utilized to initiate transmission of control messages to automatic switching equipment located on the distribution system to further isolate faulty segments and allow energizing of non-faulty segments in accordance with a rules-based procedure.

FIG. 1 depicts an example system configuration according to one embodiment of the present invention. High voltage distribution lines 100 carry generated electricity to distribution substation 102. Substation 102 includes step-down transformers 104 and 106 that reduce the line voltage to an amplitude suitable for distribution. The electricity is distributed into a set of distribution lines (also referred to herein as "feeders") indicated generally at 108, which includes feeder 108a. Although feeder 108a is shown schematically as a single line in FIG. 1, it should be understood that feeder 108a can represent a three-phase distribution circuit (delta or wye), or a single phase circuit. Each distribution line can be disconnected from the substation 102 by a corresponding circuit breaker indicated generally at 110. Feeder 108a has a corresponding circuit breaker 110a and substation bus 105.

Along feeder 108a, remote fault detection devices 112a, 112b, and 112c (generally referred to hereinafter as 112) are installed. Although FIG. 1 depicts three fault detection devices 112a, 112b, 112c, other embodiments may comprise more or fewer, corresponding to a distribution system size or configuration for example. For example, a device 112 may be installed on every pole in an above-ground distribution system in one embodiment. For economic reasons, devices 112 may be installed every several poles, for example on each fifth pole, to reduce the overall cost of implementing a fault detection system. In another embodiment, device 112 is implemented as part of an underground or buried distribution system. In yet another embodiment, devices 112 may be implemented or integrated within, or operate as part of, a capacitor bank controller (CBC) to provide additional functionality to the CBC. One example of a CBC is that commercially available from Cannon Technologies, Inc., also the assignee of the present invention. Refer, for example, to commonly assigned U.S. Provisional Patent Application Ser. No. 60/483,836, filed Jun. 30, 2003, and entitled "UNIVERSAL CAPACITOR BANK CONTROLLER WITH IMPROVED COMMUNICATION," which is hereby incorporated by reference. In another embodiment, at least some of the electronics are implemented in a substation gateway advisor such as is also available from Cannon Technologies, Inc. Refer, for example, to commonly assigned U.S. patent application Ser. No. 11/158,301, filed Jun. 21, 2005, and entitled "SENSING ARRANGEMENT AND GATEWAY FOR COUPLING FIELD DEVICES WITH A DATA NETWORK," which claims priority to U.S. Provisional Patent Application Ser. No. 60/581,413, filed Jun. 21, 2004, and entitled "SENSING ARRANGEMENT AND GATEWAY FOR COUPLING FIELD DEVICES WITH A DATA NETWORK," which are hereby incorporated by reference in their entireties.

Fault detection device 112, whether implemented as a stand-alone device or as part of a CBC or other device, preferably includes electrical parameter measurement circuitry for current metering and measurement, and electrical circuitry to provide signal conditioning and communications capabilities. In one embodiment, current metering is accomplished by a current transformer 114a, 114b, 114c (generally referred to hereinafter as current transformer 114) having a secondary winding electromagnetically coupled with feeder line 108a, which is the transformer's primary winding. In another embodiment, current in a ground conductor 107a, 107b, 107c (generally referred to hereinafter as ground conductor 107) is similarly metered using current transformer 116a, 116b, 116c (generally referred to hereinafter as current transformer 116). In one embodiment, ground conductor 107 comprises a pole ground conductor, although other implementations, including underground, are used in other embodiments.

Signal conditioning circuitry 115a, 115b, 115c (generally referred to hereinafter as 115) of device 112 operably receives signals from the secondary windings of an associated current transformer 114, and optionally from current transformer 116, and outputs a voltage, current, frequency, or other suitable signal that represents the magnitude of the current conducted through the primary side of the current transformer (a feeder wire 108a). The output of signal conditioner 115 is fed into an analog-to-digital converter (A/D) 118a, 118b, 118c (generally referred to hereinafter as 118), which periodically samples the signal conditioner's output and generates information readable by a CPU 120a, 120b, 120c (generally referred to hereinafter as 120) such as a microprocessor-based digital system, the information representing sampled electrical current measurements. CPU 120 buffers the measured electrical current information and, in one embodiment, determines ratios or performs calculations using the electrical current information.

Each CPU 120 is interfaced with a corresponding communications system 122a, 122b, 122c (generally referred to hereinafter as communications system 122). Communications system 122 can communicate over a communications channel implemented using conventional land-based or wireless telecommunications, two-way radio, cellular, satellite-based telecommunications, or the like. CPU 120 is programmed to pass the buffered measured electrical current information, or calculated values, to corresponding communications system 122 for transmission to a monitoring station 125. Communications may be achieved by direct communication as illustrated by path 130a, or by relaying data frames via an intermediate repeater, as illustrated by path 130b and 130c.

In the example embodiment illustrated in FIG. 1, a substation advisor gateway 124, a device generally used to link remote field devices with a data network, receives the information transmitted by each fault detection device 112. In another embodiment, a CBC, a device that controls a plurality of distribution line capacitors used to increase power distribution efficiency, may be used in place of the substation advisor gateway 124, as described herein above. Substation advisor gateway 124 retransmits the information (optionally in an aggregated format and according to a different communications protocol) via network 126 to central control system 125, which may include a computer with a user interface 127 running specialized distribution management software 128. In one embodiment, network 126 comprises a wide area network (WAN). Access to the information may be provided to the information via web browser access 129.

Figure 2A:
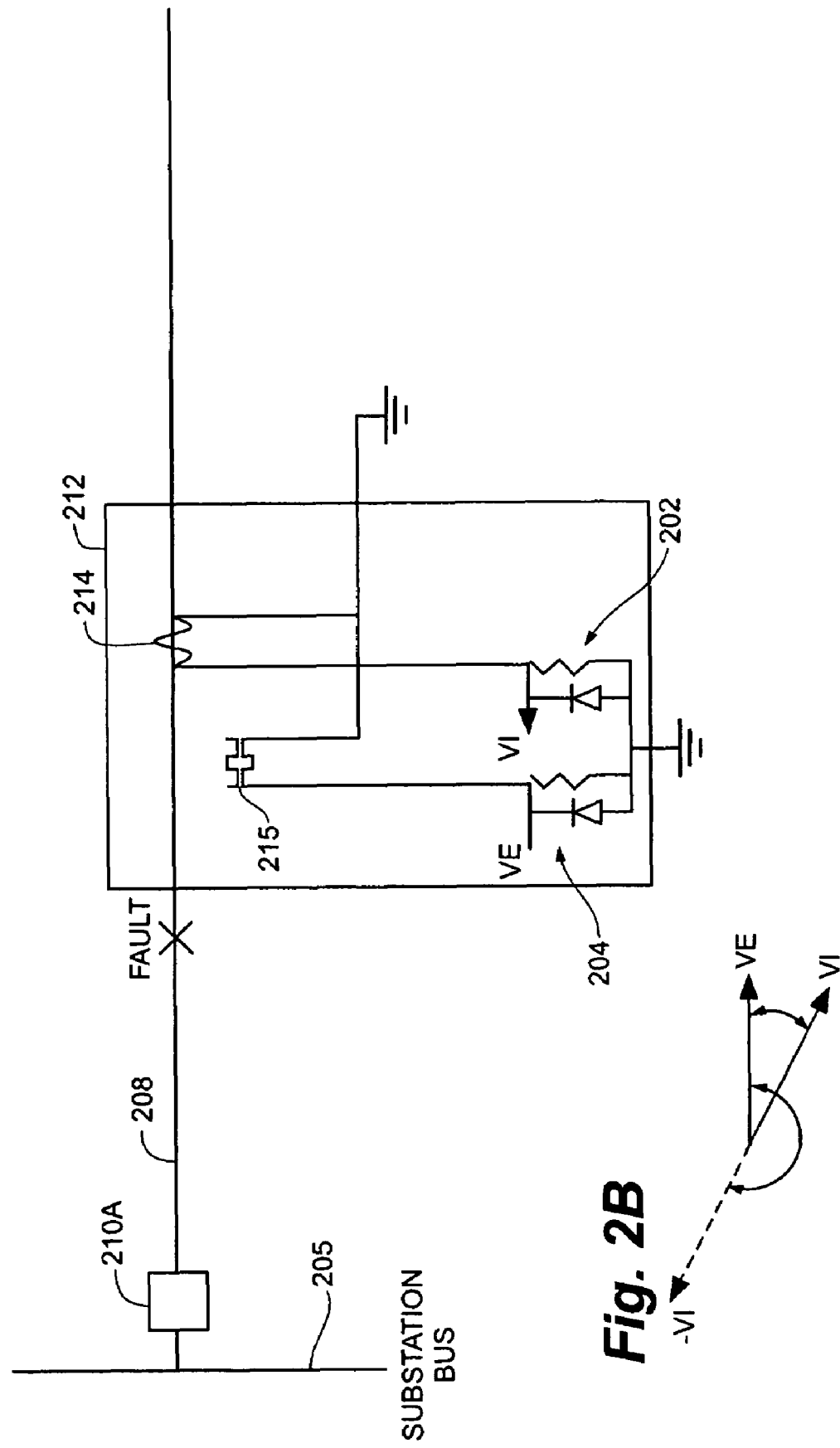
FIG. 2A is a schematic diagram of a fault detection device according to one embodiment of the present invention.
Figure 2B:
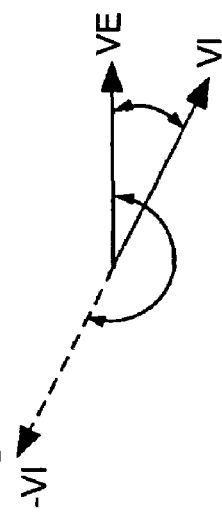
FIG. 2B is a vector diagram illustrating a reference phase angle VE, a second phase angle VI relative to VE, and a theoretical phase reversal of VI.

In some applications, as discussed in greater detail below, it is desirable for the electrical current information to include not only current magnitude, but also the phase angle of the measured current relative to a reference phase. FIG. 2A schematically illustrates an example arrangement for measuring current magnitude, as well as relative phase angle to an AC voltage signal. For simplicity, a distribution circuit 208 is shown as a single line, with an associated circuit breaker 210a and substation bus 205. However, it is to be understood that circuit 208 may be a three-phase circuit. A fault detection device 212 is coupled to circuit 208. Current transformers 214 are coupled to each of the phases of power distribution circuit 208 for measuring the current carried in each line. A voltage tap 215 is coupled to one of the phases of circuit 208, and includes a step-down transformer for converting the measured signal to an amplitude suitable for reading by electronic instrument. Each of the current transformers 214 and voltage tap 215 is connected to a respective analyzer 202, 204 that provides a vector angle corresponding to the phase angle of the measured parameter. Thus, the phase angles of the currents sensed by each of current transformers 214 are represented by vectors VI (only one is shown in FIG. 2b), and the reference phase angle of the AC voltage, as sensed by voltage tap 215, is represented by vector VE. Vectors VI and VE are fed to an analyzer (not shown) at central control system 125 that is configured to measure the relative phase angles of each vector VI and vector VE.

In another example embodiment, the reference phase angle of the voltage of one of the lines is not tapped near the point of current transformer 214, but instead is measured near substation 102. Certain waveform characteristics of the line currents are transmitted to the central control system 125 where the relative phase angles are computed. For example, a communications channel such as communication 130*a* (FIG. 1) can continuously or periodically carry phase synchronization information such as zero crossing points or wave crests of the current waveforms to a receiver and signal analyzer at the substation gateway advisor 124 or at the central control system 125.

In other embodiments, the reference phase is taken from current waveform monitoring, and vector VE would represent the current phase angle of the measured parameter. Such monitoring can be made of the current flowing in a neutral conductor at the remote indicator site or at another site. Alternatively, current waveform monitoring can be performed at a site different from the phase current monitoring location, such as line current monitoring at substation 102.

Referring again to the arrangement of FIG. 2A, under normal (non-fault) conditions, the phase angles of the current vectors VI will be about 120 degrees apart from one another. One of the phase angles of the VI vectors will be relatively near the phase angle of vector VE, the difference representing the extent of power factor degradation of the VE phase.

Assuming a particular VI and VE were derived from measurements made from different phases of circuit 208, any dramatic change in their relative phase angles would be indicative of a fault condition occurring on either the VE or the VI phases. If, for example, the amplitude of vector VI drops suddenly, it can be inferred that the associated line has been broken. Referring to FIG. 2B, if the phase angle of VI changes by 180 degrees relative to the VE reference phase angle, it can be inferred that a ground fault has occurred and reverse EMF generated by the load, rather than the utility, is now supplying the current in the line.

Figure 3:
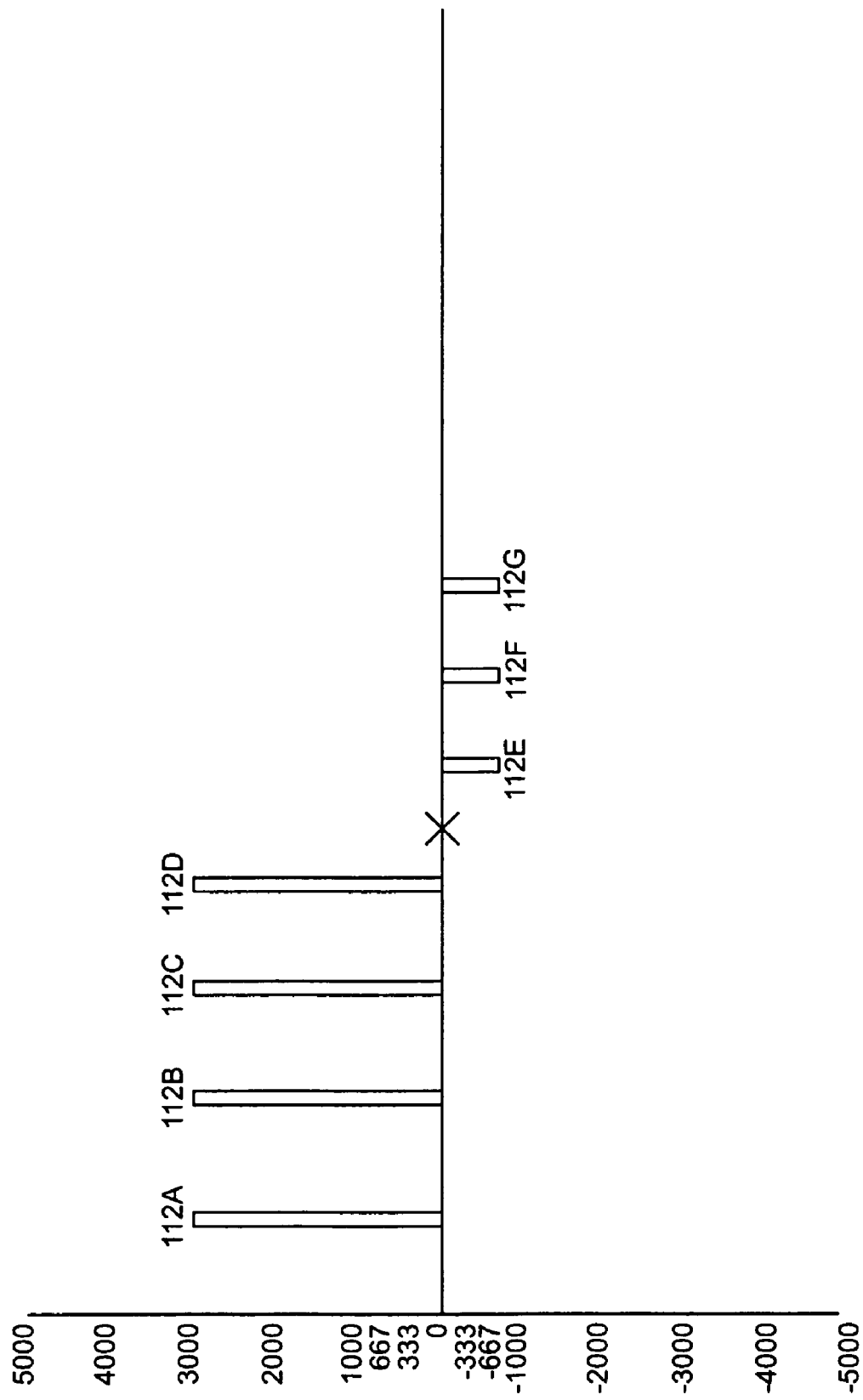
FIG. 3 is a set of current measurement graph according to one embodiment of the present invention.

Referring now to FIG. 3, a method of analyzing current measurements for identifying and/or localizing a line fault according to one embodiment of the invention is described. FIG. 3 illustrates the measured current magnitude and direction of one particular distribution line. In this example, direction refers to the relative phase angle of the current vector. Currents are measured at each fault detection device 112, at different points along the distribution line. Current measurements at fault detection devices 112*a-d* are all in the same direction and have approximately equal magnitudes. As can be seen, current measurements at fault detection devices 112*e-g* are dramatically different from those at fault detection devices 112*a-d*. Current measurements at fault detection devices 112*e-g* have an opposite direction and a different magnitude. Given this information, central control system 125 can infer that a ground fault has occurred along a segment of line located between fault detection device 112*d* and 112*e*. A repair crew can be dispatched directly to the suspect segment of the distribution line.

According to another embodiment, a method of identifying and/or localizing faults involves measuring current flowing in the neutral wire of a power distribution circuit. It is understood that in cases of a line to ground fault (short circuit to ground), the power generated or distributed down the faulty line returns to its source (the generator or distribution point) through a ground path. In single phase or wye-type three phase distribution circuits, the ground path includes the grounded neutral conductor. Therefore, one method of fault detection/localization is based on the principle that the neutral line will carry at least a detectable portion of the ground fault current.

FIGS. 4A and 4B illustrate one embodiment utilizing measurement of neutral current. A plurality of fault detection devices 112 having current measuring capabilities are placed along a power distribution line, each measuring the current flowing in the neutral wire. At example time 10:04:30, no fault condition is present and the neutral wire is carrying approximately 18 Amps. At example time 10:05:00, the current measured at fault detection devices 112*a-d* is substantially greater, while the current at fault detection devices 112*e-g* is somewhat less than what was previously measured at the same locations. Given this information, central control system 125 can infer that a ground fault has occurred along a segment of line located between fault detection device 112*d* and 112*e*. A repair crew can be dispatched directly to the suspect segment of the distribution line. The method of applying current measuring devices to the neutral wire of this embodiment, rather than the high voltage wires, provides significant reduction in measurement system equipment and installation cost. Other benefits, such as reduced system complexity and improved reliability, can also be realized.

Figure 5:
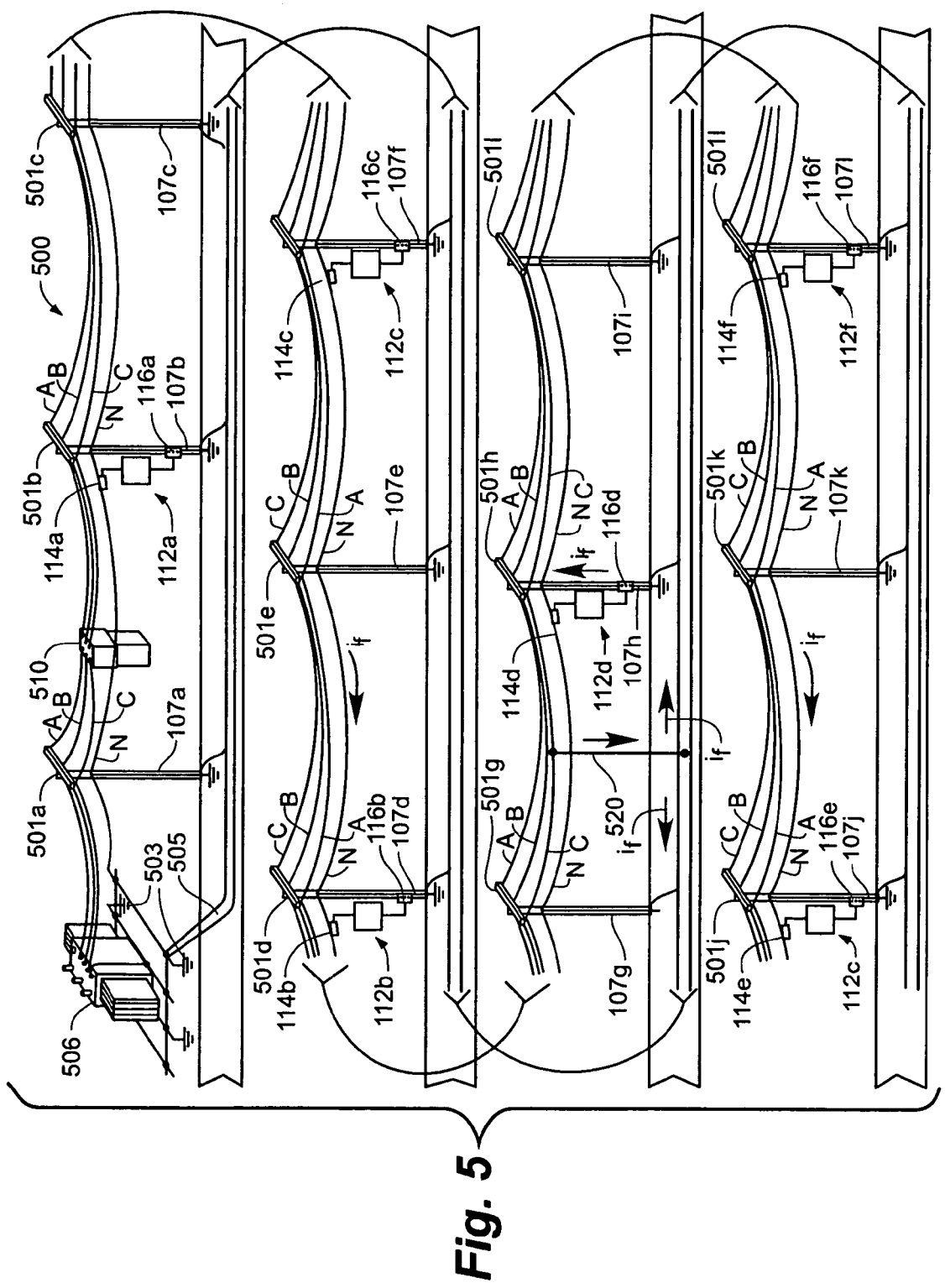
FIG. 5 is an electrical power distribution line diagram according to one embodiment of the present invention.

FIG. 5 depicts an embodiment of fault detection and localization by measuring power flows in both the neutral and ground conductors at a plurality of locations on a power distribution feeder. A feeder circuit 500 comprises a set of overhead power distribution lines that are adapted to connect a power generator (not shown) to electrical loads (not shown), as understood by one of ordinary skill in the art. Feeder circuit 500 is supported off the ground by a set of poles 501*a*-501*l*, referred to generally herein as poles 501. In another embodiment, fault detection and localization by measuring power flows in both the neutral and ground conductors may be used in conjunction with underground or buried distribution systems.

The power source is connected to primary windings of a substation transformer 506. Feeder circuit 500 is tapped from the secondary of substation transformer 506 and includes three phases, indicated as A, B, and C. A feeder breaker 510 is included in the circuit to enable disconnecting each of the phases A, B, C near the source. Feeder circuit 500 also includes a neutral conductor, which is indicated as N in FIG. 5. Neutral conductor N is grounded to the earth at substation transformer 506 by ground grid 503. Also, neutral conductor N is grounded to the earth at each pole 501. The grounding conductors 107*a*-107*l* (hereinafter referred to generally as ground conductors 107) at the poles are indicated at fault detection devices 112*a*-112*l*, respectively. The earth ground is illustrated schematically as earth conductor 505.

A set of fault detection devices for the neutral conductor N and ground conductors 107*a*-107*l*. is indicated at 112*a*-112*g*, and is referred to generally herein as fault detection devices 112. Refer generally to the description of fault detection devices 112 herein above with respect to FIG. 1. Each fault detection device 112 includes a corresponding current transformer 114 (114*a*-114*g*) electrically or electromagnetically coupled to the overhead neutral line N. Also, each fault detection device 112 includes a corresponding current transformer 116 (116*a*-116*g*) electrically or electromagnetically coupled to ground conductors 107 at each pole 501. In one embodiment, each current transformer 114 provides an output signal representing the magnitude of the current flowing at the measuring point of neutral conductor N, and each current transformer 116 provides an output signal representing the magnitude of current flowing in each respective ground conductor 107. In another embodiment, transformers 114 and 116 also provide output signals related to current phase angle in neutral conductor N and ground conductor 107, respectively.

Figure 6:
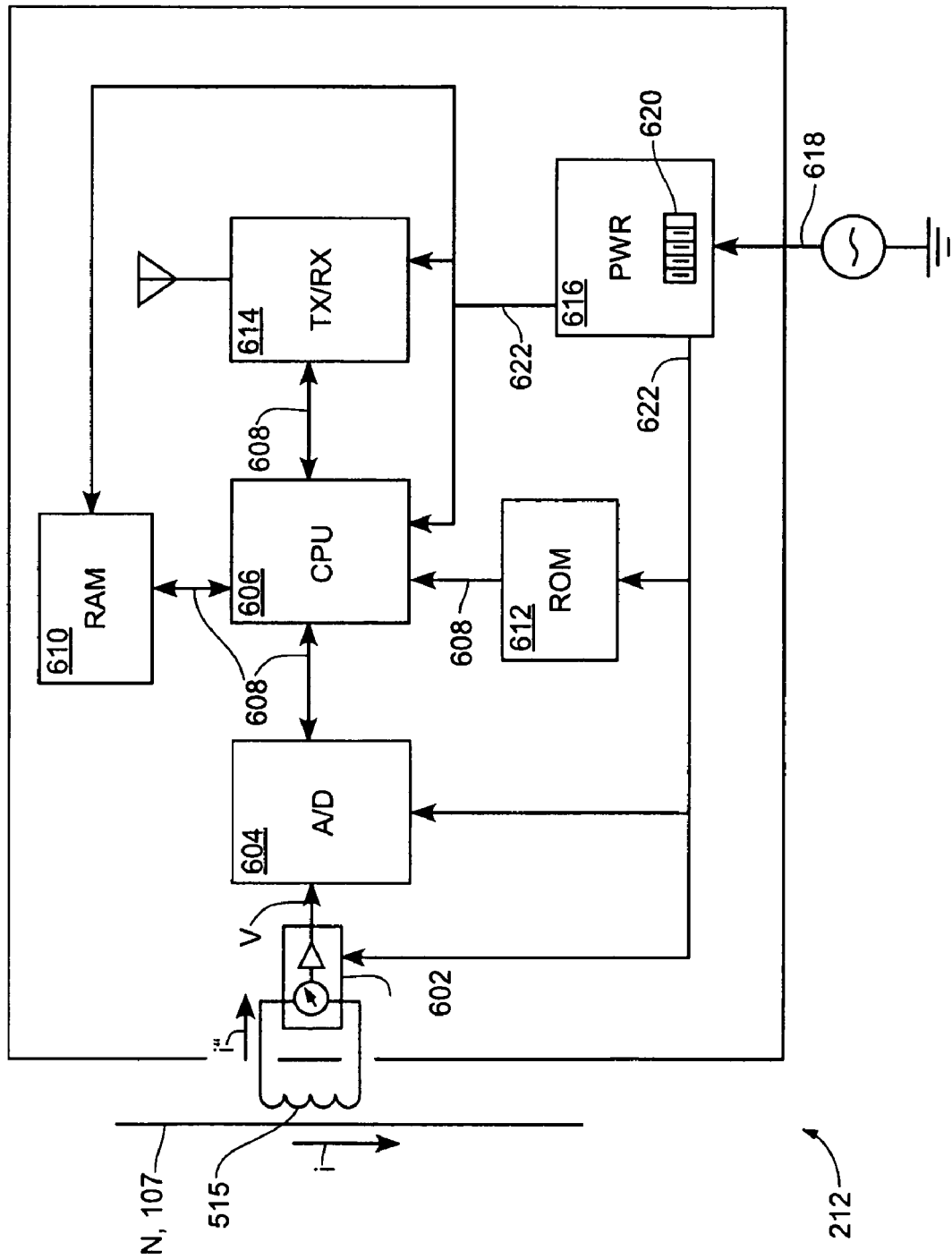
FIG. 6 is a block diagram of a fault detection device according to one embodiment of the present invention.

The output signals are fed to a measuring circuit in each corresponding fault detection device 112, one embodiment of which is depicted in FIG. 6. A transformer 515 is depicted schematically as a primary side and a secondary side. Transformer 515 represents transformer 114 or transformer 116

(FIG. 5). The primary side of transformer 515 includes the neutral conductor N (transformer 114) or the ground conductor 107 (transformer 116). An example primary current i' is depicted flowing through the primary side. An example secondary current i" is depicted flowing through the secondary side of transformer 515. Secondary current i" is fed to analog signal conditioning circuitry 602, which produces a buffered voltage signal V representing the current magnitudes and, optionally, the phase angles of currents i' and i". Voltage signal V is fed to analog-to-digital converter (A/D) 604, which samples voltage signal V at a predetermined frequency, quantizes voltage signal V into a predetermined discrete granularity, and converts voltage signal V into a stream of N-bit digital values readable by N-bit CPU 606. In one embodiment, A/D converter 604 is configured to handle two or more separate voltage signals V. This can be achieved, for example, by a two-channel A/D circuit device. Alternatively, a single A/D circuit can have a time-multiplexed input alternating between the two separate input signals. This capability enables the use of multiple current transformers and signal conditioning circuits with a single unit of processing and communications hardware.

CPU 606 interfaces with A/D 604 via address and data busses and control lines, collectively indicated at 608. CPU 606 also interfaces with memory components, such as RAM 610 and ROM 612. In one embodiment, ROM 612 stores CPU-readable instructions for carrying out the functionality of fault detection device 112. RAM 610 includes memory space for storing measurement values and for processing overhead. RAM 610 and ROM 612 are each interfaced with CPU 606 via address/data/control lines 608. CPU 606 is also interfaced with transceiver 614 via address/data/control lines 608. Transceiver 614 communicates information into, and out of, fault detection device 112. In one embodiment, transceiver 614 includes a 900 MHz spread spectrum radio. In another embodiment, transceiver 614 includes cellular communication technology. Transceiver 614 can comprise other communication circuitry and technologies in other embodiments.

Persons skilled in the art will appreciate that a variety of known communication protocols can be utilized within the spirit of the invention. For example, in one embodiment, each fault detection device 112 aggregates measurements from each current transformer 515 (transformers 114 and 116) over a predefined period of time before transmitting the data to the central control system 125. In another embodiment, each fault detection device 112 performs an analysis of current measurements to identify any unexpected changes in the measured values, and transmits to the central control system 125 only when an unexpected change has occurred. In a related embodiment, each fault detection device 112 communicates its current measurement-related data to the central control system 125 when the central control system polls the fault detection device 112.

Fault detection device 112 also includes power supply circuitry 616. In one embodiment, power supply circuitry 616 accepts externally-supplied AC power 618. In a related embodiment, power supply circuitry 616 includes on-board backup power, such as a battery 620. In an alternative embodiment, power supply circuitry 616 accepts power derived from solar energy (not shown). Power supply circuitry 616 converts and conditions the input power into a power output 622 having an amplitude and quality suitable for powering the circuitry of fault detection device 112. In one embodiment, power output 622 includes multiple output voltages, such as +/−3.3 VDC, +/−5 VDC, 12 VDC, and the like.

Referring also to FIG. 5, each fault detection device 112 monitors currents at points along neutral line N and ground conductors 107 and performs initial fault detection calculations via CPU 606. Also, each fault detection device 112 communicates with central control system 125 via transceiver 614. In one example embodiment, distribution management software 128 used in central control system 125 is Cannon Technologies Yukon® Master System Software, as described, for example, at http://www.cannontech.com/products/softwareapplications.asp#yukon.

In normal operations of a power distribution system, current measurements made by each of the fault detection devices 112 are normally expected to remain substantially constant or change marginally or slowly over time as the loading profile varies during each twenty-four-hour period. However, in the event of a ground fault, such as ground fault 520 between phase C and ground, electrical fault current $i_f$ from phase C is expected to be conducted onto the grounded network, including onto earth conductor 505 via ground conductor 107 and neutral line N as the fault current if returns to its source through the fault path. The fault current is expected to be divided among the various grounded paths according to Ohm's law. Therefore, fault currents if measured by current transformers 116 on ground conductors 107 that are generally closer to the location of the fault are expected to indicate higher fault current magnitudes. Also, fault currents if measured by transformers 114 on neutral conductor N are expected to be higher at points closest to the source of power, and are expected to substantially drop off at points along neutral conductor N that are between the location of the fault and the load end of the feeder circuit opposite the source. Moreover, in the time immediately following a fault condition, the currents in neutral conductor N and in ground conductors 107 measured by fault detection devices 112 are expected to change instantaneously to some measurable extent. The instantaneous change in measured current, and the various amplitudes measurable at different points along feeder circuit 500 and among the pole locations permits central control system 125 to make inferences as to the presence and location of at least a line-ground fault.

Figure 7:
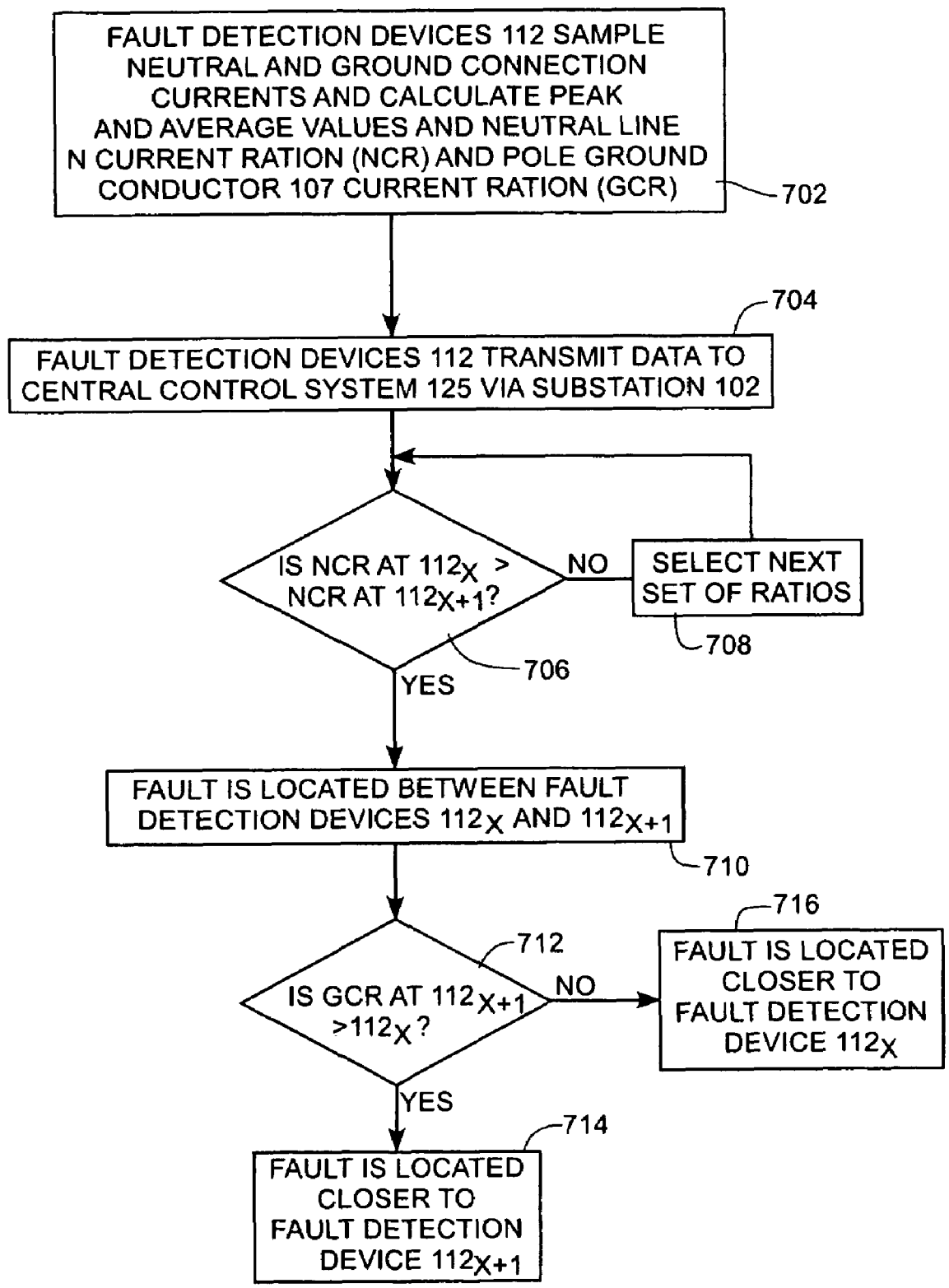
FIG. 7 is a flowchart of an analysis method according to one embodiment of the present invention.

The flowchart of FIG. 7 illustrates one embodiment of a method of the invention. Neutral line N and ground conductor 107 currents sampled by fault detection devices 112, in real time and at a plurality of locations on feeder 500, can be used to determine the location of ground fault 520. At step 702, fault detection devices 112 sample neutral line N and ground conductor currents using current transformers 114 and 116 and electrical parameter measurement circuitry at a plurality of locations, such as poles 501a-501l. In one embodiment, fault detection devices 112 sample the currents periodically, for example at approximately 2 millisecond intervals. Fault detection devices 112 then determine average and peak current values and ratios of peak to average current for neutral line N and ground conductor 107 currents. In one embodiment, the values and ratio are calculated over an approximately thirty second period.

At step 704, the calculated current values and ratios for neutral line N and ground conductors 107 are transmitted to substation gateway advisor 124, located at substation 102. Substation advisor gateway 124 transfers the current values to the central control system 125 via WAN 126. In another embodiment, the fault detection devices 112 transmit directly to central control system 125.

At steps 706 and 708, central control system 125 evaluates the ratios to determine whether a fault has occurred. By way of example, and referring also to FIG. 5, TABLE 1 provides sample current ratios for neutral line N ranging from less than 10 to 381, and pole ground conductor fault detection device ranging from 7 to 54 according to one example embodiment of the invention. The sample ratios of TABLE 1, if representing actual ratios, could be calculated from real-time system "snapshot" data taken and evaluated simultaneously at a plurality of locations on a feeder system.

TABLE 1

|  | Fault detection device | | | | | |
| --- | --- | --- | --- | --- | --- | --- |
|  | 112a | 112b | 112c | 112d | 112e | 112f |
| Neutral Line N Current Ratios | 103 | 283 | 381 | 89 | 35 | <10 |
| Pole Ground Conductor fault detection device Current Ratios | 54 | NA | 284 | 494 | 7 | 35 |

To determine the location of ground fault 520, at steps 706 and 708 the neutral line N current ratio at fault detection device 112x is compared to the neutral line N current ratio at 112x+1, where 112x represents any one of fault detection devices 112a-f, and 112x+1 represents a fault detection device adjacent to 112x. If the neutral line N current ratio at 112x is greater than the neutral line N current ratio at 112x+1, then the falling neutral current represented by the neutral line N current ratio indicates that a fault is located between fault detection devices 112x and 112x+1 (step 710). Using the example data embodied in TABLE 1, the neutral line N current ratios rise from 103 at fault detection device 112a (112x) to 283 at fault detection device 112b (112x+1). Since the neutral line N current ratio at 112a is less than the neutral line N current ratio at 112b, a fault did not occur between fault detection devices 112a and 112b. Further pairs of ratios are also compared, and when the neutral line N current ratio at 112c (381) is found to be greater than the neutral line N current ratio at 112d (89), ground fault 520 is known to be located between fault detection devices 112c and 112d.

Analysis of the ground conductor 107 current ratios in steps 712-716 provides further information on the location of ground fault 520. The location at which the ground conductor 107 current ratio peaks will correspond to one of the two previously identified fault detection devices 112. A larger ground conductor current ratio at one of the two fault detection devices indicates that ground fault 520 is closest to that corresponding fault detection device (steps 714 and 716).

Referring again to the example data of TABLE 1, the earlier analysis indicated that the ground fault was located somewhere between fault detection devices 112c and 112d. In step 718 of FIG. 7, the ground conductor 107 current ratio at 112d (494) is found to be greater than the ratio at 112c (284). Therefore, ground fault 520 is closer to fault detection device 112d (step 720). If the ground conductor 107 current ratio at 712c was greater than the ratio at 712d, then ground fault 520 would be closer to device 112c, as indicated in step 722. Knowing not only which segment of the feeder line contains the fault but also which power pole the fault is closest to allows a dispatched repair crew to more quickly locate the precise location of ground fault 520 in the field.

Although the flowchart of FIG. 7 suggests a serial approach to analyzing pairs of ratios, those skilled in the art would recognize that any number of methods can be used to compare pairs of neutral line N current ratios, such as computer-assisted modes of analysis in preferred embodiments of the invention. Preferred embodiments measure power flows in neutral and ground conductors collected simultaneously at a plurality of locations and evaluate the measured power flows and related calculated values to locate a fault.

Figure 9A:
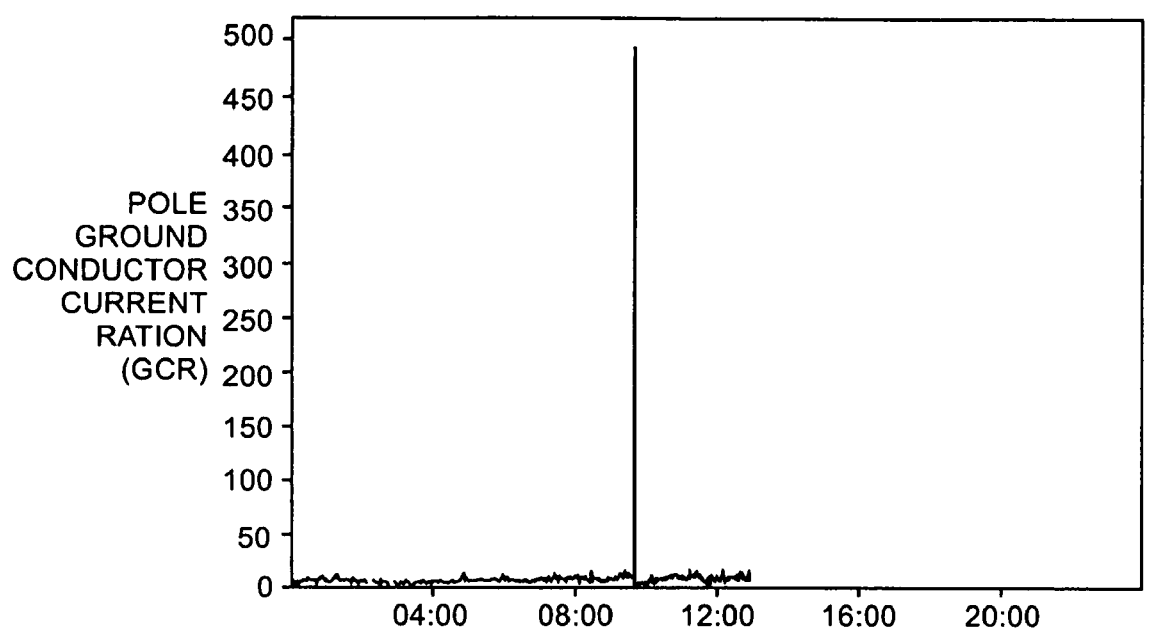
FIG. 9A is a graph of ground conductor current ratios according to one embodiment of the present invention.
Figure 9B:
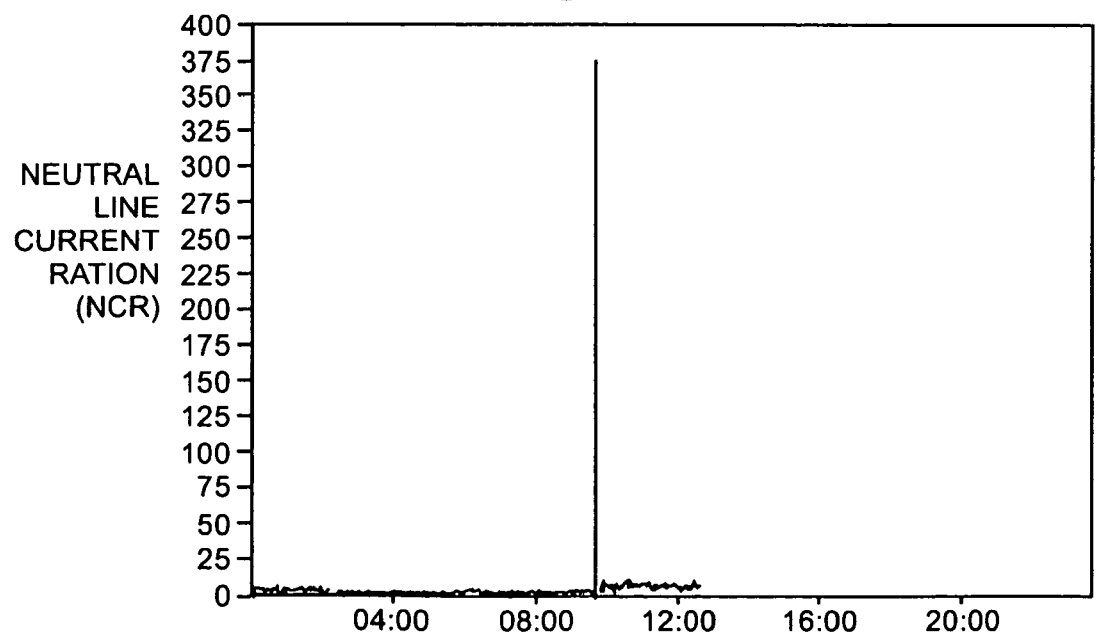
FIG. 9B is a graph of neutral current ratios according to one embodiment of the present invention.

It will be appreciated by those skilled in the art that data received from fault detection devices 112 can be reported and conveyed in a number of different ways. For example, FIG. 8 is a graphical representation of the data of TABLE 1, and FIGS. 9A and 9B are graphical representations of neutral line N ratios for multiple fault detection devices as sampled over a twenty-four-hour time period. Similar information could be conveyed in similar graphical, tabular (as in TABLE 1), or other formats to a user by means of web browser access 129 via WAN 126, or through a computer with a user interface 127 at central control system 125.

The present therefore provides systems and methods for remotely monitoring and detecting faults in power distribution systems. Various embodiments of the present invention as described herein above measure power flows in neutral and ground conductors at a plurality of locations on a power distribution feeder to localize a fault, and preferably evaluate measurements taken simultaneously at the plurality of locations to obtain a real-time multiple location view and localize a fault.

Although specific embodiments have been illustrated and described herein for purposes of description of an example embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the mechanical, electromechanical, electrical, and computer arts will readily appreciate that the invention may be implemented in a very wide variety of embodiments. This application is intended to cover any adaptations or variations of the various embodiments discussed herein, including the disclosure information in the attached appendices. Therefore, it is manifestly intended that this invention be limited only by the claims and the equivalents thereof.

The invention claimed is:

1. A remote fault monitoring system comprising:
   a plurality of remote fault detection devices distributed on a power distribution network, wherein each remote fault detection device includes
      a first electrical parameter measurement circuit electrically or electromagnetically coupled to a power distribution circuit neutral conductor, and adapted to sample the power distribution circuit neutral conductor to generate first samples that are obtained asynchronous of any injected signals generated by any other remote indication device,
      a second electrical parameter measurement circuit electrically or electromagnetically coupled to a power distribution circuit ground conductor, and adapted to sample the power distribution circuit ground conductor to generate second samples that are obtained asynchronous of any injected signals generated by any other remote indication device,
      a central processing unit (CPU) electrically coupled to the first and second electrical parameter measurement circuits and adapted to process the first and second samples to obtain electrical power parameter measurements respectively generated only by the first and second electrical parameter measurement circuits of the remote indication device, and
      a transceiver adapted to transmit the measurements obtained by the CPU;
   a monitoring station adapted to receive the measurements transmitted by the transceiver of each of the plurality of remote indication devices and to determine from the measurements whether a fault intermediate a pair of adjacent remote fault detection devices has occurred.

2. The remote fault monitoring system of claim 1, further comprising:
a first current transformer electrically or electromagnetically coupling the first electrical parameter measurement circuit to the neutral power distribution circuit conductor; and
a second current transformer electrically or electromagnetically coupling the second electrical parameter measurement circuit to the power distribution circuit ground conductor.

3. The remote fault monitoring system of claim 2, wherein the measurements respectively generated by the first and second electrical parameter measurement circuits comprise a current magnitude of a current in each the power distribution circuit neutral conductor and the power distribution circuit ground conductor.

4. The remote fault monitoring system of claim 3, wherein the measurements respectively generated by the first and second electrical parameter measurement circuits are simultaneously collected for each of the plurality of remote fault detection devices.

5. The remote fault monitoring system of claim 3, wherein the first and second electrical parameter measurement circuits are adapted to sample a plurality of current magnitude measurements over a period of time.

6. The remote fault monitoring system of claim 5, wherein the measurements are sampled approximately every two milliseconds, and wherein the period comprises approximately thirty seconds.

7. The remote fault monitoring system of claim 3, wherein the CPU is further adapted to determine a peak current value, an average current value, and a ratio of peak to average current values in each the power distribution circuit neutral conductor and the power distribution circuit ground conductor, and wherein the monitoring station is adapted to compare the ratios at adjacent remote fault detection devices among the plurality of remote fault detection devices to determine whether a fault intermediate a pair of adjacent remote fault detection devices has occurred.

8. The remote fault monitoring system of claim 7, wherein the monitoring station is further adapted to compare the ratios of peak to average current in the power distribution circuit neutral conductor to locate a decrease in the ratio at adjacent remote fault detection devices and to compare the ratios of peak to average current in the power distribution circuit ground conductor at the adjacent remote fault detection devices, and wherein the monitoring station is further adapted to determine the fault is located closer to the one of the adjacent remote fault detection devices having a greater peak to average current in the power distribution circuit ground conductor.

9. The remote fault monitoring system of claim 1, wherein the transceiver comprises at least one communication device selected from the group consisting of a WAN-implemented land-based telecommunications device; a two-way radio device; a cellular device; and a satellite-based telecommunications device.

10. The remote fault monitoring system of claim 1, wherein the monitoring station comprises a database associating each remote fault detection device with a corresponding location along the power distribution network.

11. The remote fault monitoring system of claim 1, wherein the determination of a fault by the monitoring station prompts generation of a report including fault location information.

12. The remote fault monitoring system of claim 11, wherein the fault location information prompts transmission of a control message to an automatic switch located on the power distribution network to isolate a faulty segment of the network.

13. A method for remote fault monitoring comprising the steps of:
obtaining a plurality of sets of electrical measurements, each set associated with a different point in a power distribution system and comprising a neutral conductor measurement and a ground conductor measurement;
determining a peak value, an average value, and a ratio of peak to average values for each a neutral conductor and a ground conductor from the neutral conductor measurement and the ground conductor measurement;
comparing the ratios of peak to average values for the neutral conductor to locate a decrease in the ratio between adjacent points;
locating a fault between the adjacent points at which the decrease occurs;
comparing the ratios of peak to average values for the ground conductor at the adjacent points; and
estimating the fault as located more closely to the point having a greater ratio of peak to average values for the ground conductor.

14. The method of claim 13, wherein the step of obtaining a plurality of sets of electrical measurements further comprises simultaneously obtaining a plurality of sets of electrical measurements each set associated with a different point in a power distribution system and comprising a neutral conductor measurement and a ground conductor measurement.

15. The method of claim 13, further comprising the steps of:
generating a report including fault location information; and
transmitting a control message to an automatic switch located on the power distribution system to isolate a faulty segment of the system.

16. The method of claim 13, wherein the step of obtaining a plurality of sets of electrical measurements further comprises obtaining a magnitude of current flowing through each the neutral conductor and the ground conductor at a plurality of points in the power distribution system, and wherein the step of determining a peak value, an average value, and a ratio of peak to average values further comprises determining a peak current value, an average current value, and a ratio of peak to average current for each the neutral conductor and the ground conductor.

17. The method of claim 13, wherein the step of obtaining a plurality of sets of electrical measurements further comprises sampling a plurality of sets of electrical measurements approximately every two milliseconds for about thirty seconds.

18. A remote fault monitoring system comprising:
means for obtaining a plurality of sets of electrical measurements, each set associated with a different point in a power distribution system and comprising a neutral conductor measurement and a ground conductor measurement;
means for determining a peak value, an average value, and a ratio of peak to average values for each a neutral conductor and a ground conductor from the neutral conductor measurement and the ground conductor measurement;
means for comparing the ratios of peak to average values for the neutral conductor to a predetermined limit;

means for comparing a set of ratios of peak to average values for the neutral conductor to locate a decrease in the ratio at adjacent points if a ratio exceeds the predetermined limit;

means for locating a fault between the adjacent points at which the decrease occurs;

means for comparing the ratios of peak to average values for the ground conductor at the adjacent points; and means for estimating the fault as located more closely to the point having a greater ratio of peak to average values for the ground conductor.

19. The remote fault monitoring system of claim 18, further comprising:

means for generating a report including fault location information; and means for transmitting a control message to an automatic switch located on the power distribution system to isolate a faulty segment of the system.

20. The remote fault monitoring system of claim 18, wherein the means for obtaining a plurality of sets of electrical measurements further comprises means for obtaining a magnitude of current flowing through each the neutral conductor and the ground conductor at a plurality of points in the power distribution system, and wherein the means for determining a peak value, an average value, and a ratio of peak to average values further comprises means for determining a peak current value, an average current value, and a ratio of peak to average current for each the neutral conductor and the ground conductor.

21. The remote fault monitoring system of claim 18, wherein the means for obtaining a plurality of sets of electrical measurements further comprises means for simultaneously sampling a plurality of sets of electrical measurements approximately every two milliseconds for about thirty seconds.

22. A remote fault monitoring system comprising:

a plurality of remote fault detection devices distributed on a power distribution network, wherein each remote fault detection device includes a first electrical parameter measurement circuit electrically or electromagnetically coupled to a power distribution circuit neutral conductor, a second electrical parameter measurement circuit electrically or electromagnetically coupled to a power distribution circuit ground conductor, a central processing unit (CPU) electrically coupled to the first and second electrical parameter measurement circuits and adapted to obtain measurements respectively generated by the first and second electrical parameter measurement circuits, wherein the measurements respectively generated by the first and second electrical parameter measurement circuits comprise a current magnitude of a current in each of the power distribution circuit neutral conductor and the power distribution circuit ground conductor, and a communication device, wherein said communication device transmits the measurements obtained by the CPU; and a monitoring station, wherein the monitoring station receives the transmission of the measurement from the CPU and determines from the measurements from each of the plurality of remote indication devices whether a fault intermediate a pair of adjacent remote fault detection devices has occurred.

* * * * *